United States Patent [19]

Strobel

[11] Patent Number: 4,832,548

[45] Date of Patent: May 23, 1989

[54] BLIND FASTENER FOR COMPOSITE MATERIAL

[75] Inventor: Burton C. Strobel, Warminster, Pa.

[73] Assignee: SPS Technologies, Inc., Newtown, Pa.

[21] Appl. No.: 20,428

[22] Filed: Mar. 2, 1987

[51] Int. Cl.$^4$ .................... F16B 13/04; F16B 13/06
[52] U.S. Cl. ................................. 411/42; 411/43; 411/38; 411/55
[58] Field of Search .................. 411/34–38, 411/39, 41, 42, 43, 44, 55, 69, 70

[56] References Cited

U.S. PATENT DOCUMENTS

| | | | |
|---|---|---|---|
| 4,168,650 | 9/1979 | Dahl et al. | 411/43 |
| 4,364,697 | 12/1982 | Binns | 411/43 |
| 4,457,652 | 7/1984 | Pratt | 411/38 |
| 4,579,491 | 4/1986 | Kull | 411/43 |
| 4,595,324 | 6/1986 | Sadri | 411/38 |

Primary Examiner—Neill R. Wilson
Attorney, Agent, or Firm—James D. Dee; Aaron Nerenberg

[57] ABSTRACT

A blind fastener assembly suitable for use in joint assemblies including advanced composite material workpieces. The blind fastener assembly includes a core pin having an enlarged head, an expander having a head and a tapered nose portion and being mounted to the core pin, and a frangible sleeve mounted to the core pin between the enlarged head and the expander. The blind fastener assembly is insertable through aligned holes in the workpieces so that the head of the expander abuts the accessible side of the workpiece. Relative longitudinal movement of the core pin and the expander nut causes the sleeve to expand over the tapered nose and to break into two pieces, one of the two pieces expanding over the other of the two pieces to provide a large bearing surface on the blind side of the workpieces.

23 Claims, 2 Drawing Sheets

BLIND FASTENER FOR COMPOSITE MATERIAL

BACKGROUND OF THE INVENTION

The present invention relates to improvements in blind fasteners and the joints produced therewith.

Advanced composite materials have recently been gaining increasing usage in various aerospace applications because they offer potential weight savings and increased stiffness. The anisotropic properties of composite materials present a unique opportunity to optimize certain structural designs such as elongated aircraft stringers and ribs. In order to form acceptable joints of relatively thin sheet composite materials, conventional blind fasteners have not proven to be completely acceptable.

One reason is the low allowable bearing stress of composite materials which means that the full tensile strength of the blind fastener may not be realized because of bearing failure of the composite material. Present blind fasteners have a relatively limited blind side bearing area and typically expand to approximately 1.3 times the original sleeve diameter. Another reason is that composite materials are weaker in shear, thus causing any holes to require greater edge distances and more area buildup to develop full efficiency of the composite material.

Advanced composite materials are constructed of a resin matrix which has a tendency to crack when holes in the material are expanded, such as by cold working or by an interference fit fastener. Rivets which swell when upset may also crack the resin matrix. Finally, fasteners which form against the blind side composite material surface tend to damage the relatively soft material surface by digging or gouging out some of the material during the bearing surface formation process. Additionally, fasteners which form against the blind side composite material surface may cause stress concentrations during the formation process which exceed the compressive strength limit of such materials, thus causing damage.

Some blind fasteners taught by the prior art form a bearing surface on the blind side of the workpiece before contact is made with the workpiece. However, such fasteners have not proven entirely satisfactory for a variety of reasons, including problems associated with consistently and reliably forming the bearing surface before contact with the workpiece. Additionally, some conventional blind fasteners cannot conform to the irregular contour of the composite material blind surface and tend to crush the raised points of the material, thus reducing overall material strength.

In order to solve these problems, the present invention is directed to an improved blind fastener assembly which has a large bearing area, does not expand the holes in the respective workpieces in which the fastener assembly is installed, and in which the formation of the blind side bearing surface is not sensitive to variations in grip length.

A prior art design for a blind fastener providing an enlarged bearing area is disclosed in U.S. Pat. No. 4,579,491 issued Apr. 1, 1986 to Kull. In Kull, a sleeve and a coil washer expanded over a tapered nose to form a bearing surface. While the fastener does provide a large bearing surface and is insensitive to variations in grip length, the core pin of this fastener is necessarily smaller in diameter than may be preferred, therefore exotic high strength materials are sometimes required to provide this fastener with a preselected strength.

Therefore the present invention is also directed to providing a blind fastener of the type described by having an increased diameter core pin.

SUMMARY OF THE PRESENT INVENTION

The present invention provides an improved blind fastener assembly and an improved joint assembly using the blind fastener assembly.

The blind fastener assembly has a core pin, an expander, and a sleeve, each having an initial diameter which permits it to pass through a hole in a workpiece. The core bolt has a head at one end and a shank extending therefrom. The sleeve has a primary portion and a secondary portion, the secondary portion being provided with a frustoconical region interconnected with the main portion by a circular web of material. The sleeve is fitted over the shank of the core pin with the primary portion abutting the head of the core pin. The expander is provided with a tapered nose portion at one end and a head at its other end. The expander is mounted to the shank with the nose portion abutting the secondary portion of the sleeve.

In use, the blind fastener assembly is passed through a hole in a workpiece, or aligned holes in two or more workpieces, until the head of the expander abuts the access side of the joint. Relative longitudinal movement of the core pin and the expander forces the tapered nose into the sleeve and causes it to expand. As the sleeve expands, the web between the primary and secondary portions of the sleeve breaks. When the secondary portion of the sleeve abuts the blind side of the workpiece, the continued relative longitudinal movement of the core bolt and the expander causes the primary portion of the sleeve to expand over the frustoconical region of the secondary portion of the sleeve until the primary portion also abuts the blind side of the workpiece.

In the preferred embodiment, the shank of the core pin is a core bolt which is externally threaded and the expander is an expander nut threaded onto the shank such that the fastener assembly is adapted to be installed by rotating the expander nut relative to the shank.

Furthermore, in the preferred embodiment, an expandable washer is mounted to the shank of the core bolt between the sleeve and the expander. The washer is expanded over the tapered nose of the expander ahead of the sleeve such as to form a protective bearing surface between the respective sleeve portions and the workpiece, thereby further minimizing potential damage to the workpiece material during the formation of the joint.

The primary object of the present invention is to provide an improved blind fastener assembly providing a large diameter core bolt and a large blind side bearing area while minimizing damages to the blind side surface of the workpiece.

It is another object of the present invention to provide a fastener assembly in which the formation of the blind side bearing surface is not sensitive to variations in grip length.

It is still another object of the present invention to provide an improved blind fastener assembly which does not expand the holes in the workpiece in which it is installed.

It is yet another object of the present invention to provide a blind fastener assembly in which the blind side bearing surface will conform to the contour of the blind side workpiece surface.

It is still yet another object of the present invention to provide an improved blind fastener assembly for use with composite materials.

It is another object of the present invention to provide an improved blind fastener assembly providing a large bearing surface to abut against the blind side workpiece surface using a small number of inexpensive components.

These and the many other objects, features, and advantages of the present invention will become apparent to those skilled in the art when the following detailed description of the present invention is read in conjunction with the drawings appended hereto.

While the invention will be described in connection with preferred embodiments, it will be understood that it is not intended to limit the invention to those embodiments. On the contrary, it is intended to cover all alternatives, modifications, and equivalents as may be included within the spirit and scope of the invention as defined by the appended claims.

BRIEF DESCRIPTION OF THE DRAWINGS

In the drawings appended hereto, which are offered by way of example and not by way of limitation, and wherein like reference numerals refer to like components throughout:

FIGS. 5 through 9 are each enlarged partial sectional views of alternate examples of structure for joint assemblies and blind fastener assemblies according to the present invention.

DETAILED DESCRIPTION OF THE PREFERRED EMBODIMENTS

Figure 1:
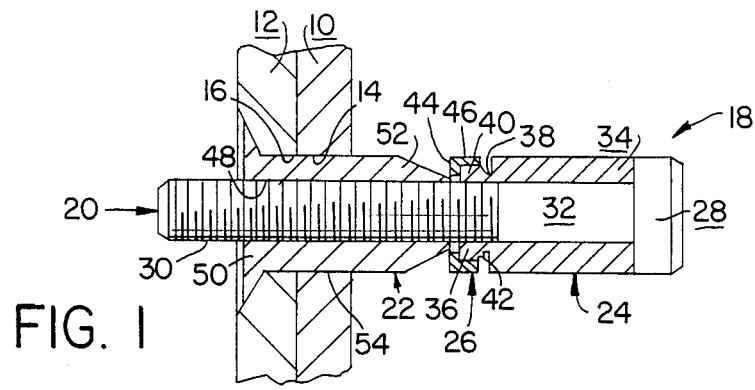
FIG. 1 is a cross sectional view, with parts in elevation, illustrating an example of structure of a joint according to the present invention consisting of a pair of workpieces and a blind fastener assembly according to the present invention installed in aligned holes in the pair of workpieces prior to any forming operation.

Referring to FIGS. 1 through 4, a first example of a joint assembly according to the present invention is shown in varying stages of installation. Work pieces 10 and 12 are provided with aligned holes 14 and 16 accepting a blind fastener assembly 18 according to the present invention.

The blind fastener assembly 18 includes a core bolt 20, an expander nut 22, a sleeve 24 and an expandable protective washer 26. The core pin or core bolt 20 has an enlarged head 28 at one end thereof and includes external threads 30 disposed on a shank 32 extending from the enlarged head 28.

As shown in FIG. 1, the sleeve 24 includes a primary sleeve portion 34 fitted onto the shank 32 of the core pin 20 such as to abut the enlarged head 28 thereof. The sleeve 24 also includes a secondary sleeve portion 36 interconnected with the main sleeve portion 34 by a reduced diameter web 38. The secondary sleeve portion 36 has a cylindrical region 40 and a frustoconical region 42 extending between the web 38 and the cylindrical region 40.

The protective washer 26 is also fitted on the core pin 20 and abuts the cylindrical region 40 of the secondary portion 36 of the sleeve 24. The protective washer 26 has a flat annular portion 44 and an axially oriented flange portion 46 extending longitudinally from the radially most portion thereof. The flange portion 46 is proportioned such as to fit over at least part of the secondary portion 36 of the sleeve 24.

The expander nut 22 has an internal thread 48 engagable with the external thread 30 of the core bolt 20. The expander nut 22 is also provided with head 50 disposed at one end thereof and a tapered nose 52 at the other end thereof. Intermediate the head 50 and the nose 52 of the expander nut 22, the expander nut is provided with a cylindrical surface 54 having the same outer diameter as each of the flange 46 of the protected washer 44, the main portion 34 of the sleeve 24, and the head 28 of the core bolt 20.

Appropriate rotation of the core bolt 20 with respect to expander nut 22 will draw the enlarged head 28 of the pin 20 toward workpieces 10 and 12, also drawing the sleeve 24, which is carried on the shank of the pin adjacent to the head 28, toward the expander nut 22. A wrenching configuration such as a pair of flats, not illustrated but well known in the art, is included on the pin 20 for accepting a tool driving bit, also not illustrated. It should be understood that the pin 20 may alternatively include a plurality of circumferential grooves (not shown) in place of external threads 30 and the mating threads 48 on the expander nut 22. Such grooves are commonly employed on similar pulling pin devices and are formed to be gripped by any one of a number of conventional pull-type guns for exerting the necessary axial force on core pin 20. This alternate arrangement is not illustrated because it is quite conventional and fully known to those skilled in the art.

Figure 2:
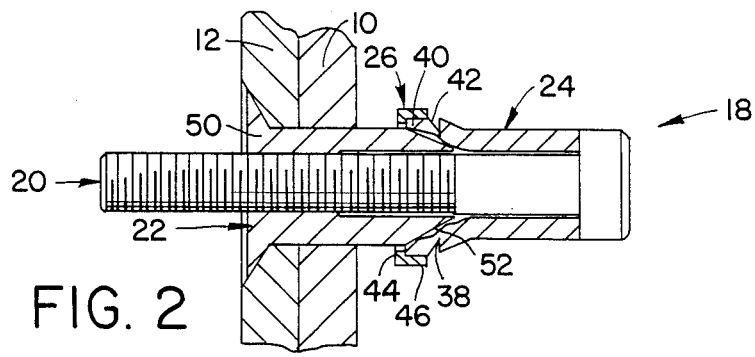
FIG. 2 is a cross sectional view of the joint assembly of FIG. 1 wherein the blind fastener assembly is in a first intermediate position during a forming operation.

During installation of the blind fastener assembly 18, the core pin 20 is caused to move axially so as to draw the head 28 of the pin 20 toward the expander nut 22 and, hence, workpieces 10 and 12. Such movement is caused when an axial force is exerted on the core pin 20 by exerting a torque on the pin 20 or by pulling on the core pin 20 by means of a pull-gun (not shown). Referring to FIG. 2 as the core pin 20 is advanced through the workpieces 10 and 12, the washer 26 is brought into contact with the end 45 of the expander's tapered nose portion 52. Continued advancement of core pin 20 causes the nose portion 52 of expander nut 22 to force the washer 26 and the secondary sleeve portion 36 to expand over the tapered nose portion 52.

Figure 3:
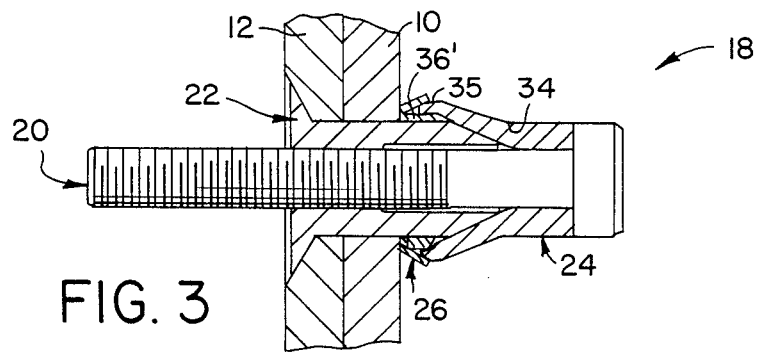
FIG. 3 is a cross sectional view of the blind joint assembly of FIG. 1 wherein the blind fastener assembly is shown in a second intermediate position during a forming operation.
Figure 4:
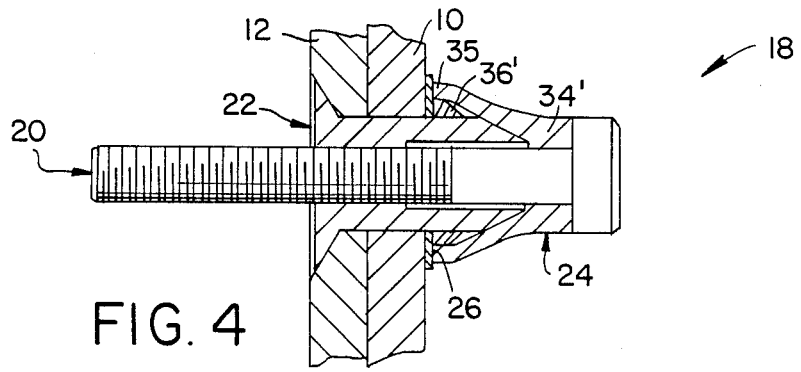
FIG. 4 is a cross sectional view of the joint assembly of FIG. 1 wherein the blind fastener assembly is depicted in a fully installed condition with the washer thereof bearing against the blind side surface of one of the workpieces.

During the expansion of the sleeve 24, the web 38 breaks, separating the sleeve into a primary sleeve 34' and a secondary sleeve 36'. Continued movement of the head 28 and the sleeve 24 toward the workpieces 10 and 12 causes primary sleeve 36' to expand over the frustoconical region of the secondary sleeve 34' as is shown in FIG. 3. The washer 26 is opened by the leading edge 35 of the primary sleeve 36' and of workpiece 10, as is shown if FIG. 4. Advancement of the core pin 20 through the workpieces 10 and 12 is continued subsequent to the seating of washer 26 against workpiece 10, until the desired preload is reached. Thereupon, the shank 32 of the core pin 20 may fracture at a suitably dimensioned breakneck groove, not shown but well-known in the art.

It should be understood that some form of locking configuration (not shown) may be provided between the core pin 20 and the expander nut 22 to keep the pin from moving in an axial direction after the joint is formed, and to maintain the desired preload in the joint. Examples of such a locking configuration could be a prevailing torque feature between the mating threads or any one of the numerous known conventional locking features.

Referring now to FIGS. 5 through 9, variations on the blind fastener assembly 18 of the present invention will be described briefly.

Figure 5:
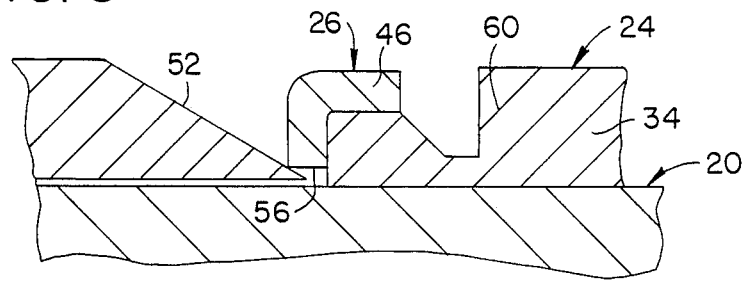
Figure 6:
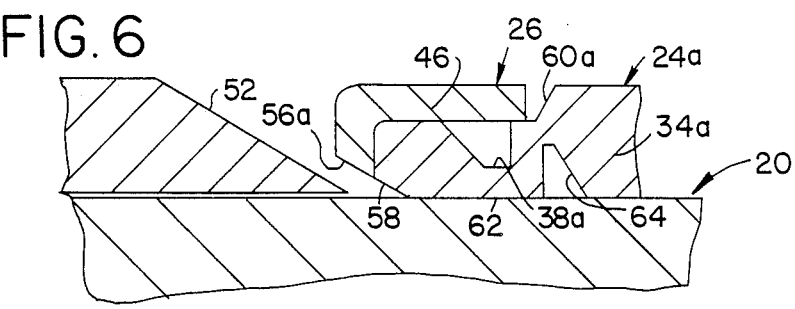
Figure 7:
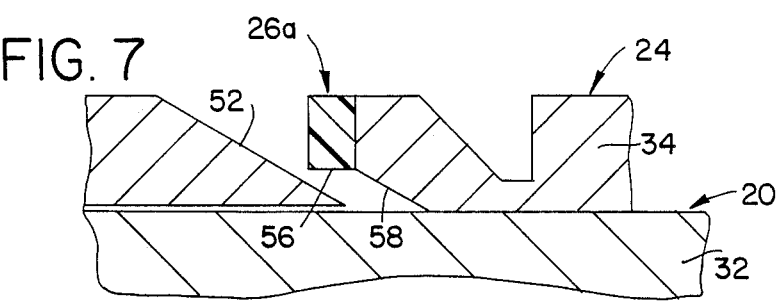
Figure 8:
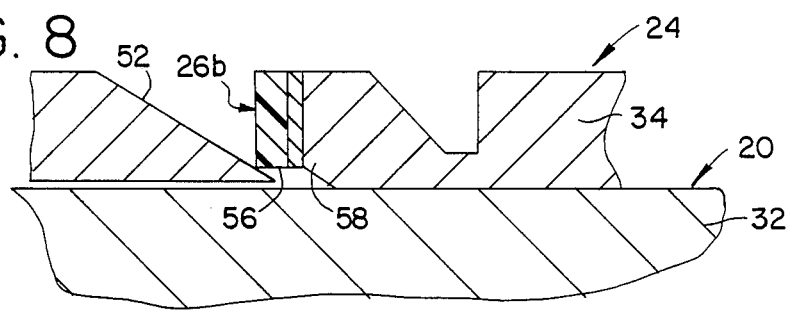

As shown in the drawing, minor alterations to the sleeve 24 and the washer 26 may be made to facilitate the expansion of the members and the opening of the washer. For example, the washer 26 may be provided with a recess as inner diameter 56 as shown in FIGS. 5, 7 and 8 or a bevel 56, as shown in FIG. 6 facilitating entry of the nose 52 into the center of the washer. Similarly, the sleeve 24 may be provided with a bevel 58 as depicted in FIGS. 6, 7 and 8 facilitating entry of the nose into the center of the sleeve. A bevel 60, illustrated in FIG. 5, or a beveled notch 60a illustrated in FIG. 6 may be provided on the leading edge of the primary portion 34 of the sleeve 24 to cooperate with the flange 46 of the washer 26 such as to smoothly open the flange to form a flat bearing surface.

Another embodiment of the washer 26a is shown in FIG. 7 wherein the washer is formed of a ring of resilient material.

An alternated form of washer 26b is shown in FIG. 8 and is formed in the shape of a helical spring having two turns. While a washer having two turns is shown, it should be understood that more or less than two turns could be used. The spring is designed so that when it is fully expanded, there will be no overlap of its ends, thus presenting a flat bearing surface to the blind side of the workpiece 10.

Still another modification of the present invention is illustrated in FIG. 6 wherein an annular recess 64 is formed on the inner wall 62 of the primary portion 34a of the sleeve 34a at a location adjacent the web 38a. As will be apparent to those skilled in the art, during installation of the blind fastener assembly 18 using the sleeve 34a, the primary portion 34a will begin to advance over the secondary portion 36a due to the folding of the web 38a even before the web tears, thus facilitating the proper formation of the blind side bearing surface.

Heretofore, the blind fastener assembly 18 constructed in accordance with the present invention has been described as being particularly well-suited for use with advanced composite materials. It should be understood that this invention can also be used with conventional materials with equally effective results.

The above provides a detailed description of the best mode contemplated by the inventor at the time of filing for carrying out the present invention and is offered by way of example and not by way of limitation. It will be appreciated by those skilled in the art that many modifications variations may be made to the present invention without departing from the spirit thereof. For example the washer 26 may be completely eliminated for some types of installations. Such variations and modifications are included within the intended scope of the claims appended hereto.

What is claimed as novel is as follows:

1. A blind fastener assembly, adapted to be installed in a workpiece having a first and a second surface with an opening therebetween, said blind fastener comprising:

a core pin including a shank portion formed to pass through the opening in the workpiece and an enlarged head at one end thereof;

expander means including an enlarged head at one end thereof formed to bear against the first surface of the workpiece, a tapered nose portion at the other end thereof, and a shank portion therebetween, said expander means having a bore there through adapted to receive said shank portion of said core pin and being adapted to fit into and extend through the opening in the workpiece wherein said nose portion extends beyond the second surface of the workpiece;

expandable sleeve means carried on said core bolt shank portion between said nose portion of said expander means and the end of said core pin which passes through the opening in the workpiece, said expandable sleeve means having a reduced diameter intermediate portion such as to separate and detach said expandable means into a first and a second sleeve portion, said expandable sleeve means being operably engaged with said core pin such that said core pin causes said sleeve means to advance toward the second surface of the workpiece, said sleeve means being adapted to expand over said expander means tapered nose portion and thereafter to separate and detach at said reduced diameter intermediate portion such that said second sleeve portion expands over said first sleeve portion to bear against the second surface of the workpiece;

wherein said blind fastener assembly further comprises resilient washer means carried on said core pin shank portion between said expander means and said expandable sleeve means, said sleeve means being adapted to force said washer means to expand over said expander means and over said tapered nose portion until said washer bears against the second surface of the workpiece; and, wherein said resilient washer means comprises an annular washer having a longitudinally extending outer flange, said outer flange being opened to form said bearing surface by said second sleeve portion as said second sleeve portion is expanded over said first sleeve portion.

2. A blind fastener assembly, adapted to be installed in a workpiece having a first and a second surface with an opening therebetween, said blind fastener comprising:

a core pin including a shank portion formed to pass through the opening in the workpiece and an enlarged head at one end thereof;

expander means including an enlarged head at one end thereof formed to bear against the first surface of the workpiece, a tapered nose portion at the other end thereof, and a shank portion therebetween, said expander means having a bore there through adapted to receive said shank portion of said core pin and being adapted to fit into and extend through the opening in the workpiece wherein said nose portion extends beyond the second surface of the workpiece;

expandable sleeve means carried on said core bolt shank portion between said nose portion of said expander means and the end of said core pin which passes through the opening in the workpiece, said expandable sleeve means having a reduced diameter intermediate portion such as to separate and detach said expandable means into a first and a second sleeve portion, said expandable sleeve means being operably engaged with said core pin such that said core pin causes said sleeve means to advance toward the second surface of the workpiece, said sleeve means being adapted to expand over said expander means tapered nose portion and thereafter to separate and detach at said reduced diameter intermediate portion such that said second sleeve portion expands over said first sleeve portion to bear against the second surface of the workpiece;

wherein said blind fastener assembly further comprises an internal annular recess formed in said first portion of said sleeve, such that a web portion folds to form tapered folds as said sleeve is expanded over said tapered folds as said sleeve is expanded over the tapered nose portion of said expander such as to facilitate the expansion of said second portion over said first portion of said sleeve.

3. A joint assembly comprising;

a workpiece having a first and a second surface with an opening therebetween;

a core pin including a shank portion formed to pass through the opening in said workpiece and an enlarged head at one end thereof;

expander means including an enlarged head at one end thereof formed to bear against the first surface of said workpiece, a tapered nose portion at the other end thereof, and a shank portion therebetween, said expander means having a bore there through adapted to receive said shank portion of said core pin and being adapted to fit into and extend through the opening in the workpiece wherein said nose portion extends beyond said second surface of the workpiece;

expandable sleeve means carried on said core bolt shank portion between said nose portion of said expander means and the end of said pin member which passes through the opening in said workpiece, said expandable sleeve means having a reduced diameter intermediate portion such as to separate and detach said expandable means into a first and a second sleeve portion, said expandable sleeve means being operably engaged with said core pin such that said core pin causes said sleeve means to advance toward said second surface of said workpiece, said sleeve means being adapted to expand over said expander means tapered nose portion and thereafter to separate and detach at said reduced diameter intermediate portion such that said second sleeve portion expands over said first sleeve portion to bear against said second surface of the said workpiece;

wherein said joint assembly further comprises resilient washer means carried on said core pin shank portion between said expander means and said expandable sleeve means; and, wherein said resilient washer means comprises an annular washer having a longitudinally extending outer flange, said outer flange being opened to form said bearing surface by said second sleeve portion.

4. A blind fastener assembly, adapted to be installed in a workpiece having a first and a second surface with an opening therebetween, said blind fastener comprising:

a core pin including a shank portion formed to pass through the opening in the workpiece and an enlarged head at one end thereof;

expander means including an enlarged head at one end thereof formed to bear against the first surface of the workpiece, a tapered nose portion at the other end thereof, and a shank portion therebetween, said expander means having a bore there through adapted to receive said shank portion of said core pin and being adapted to fit into and extend through the opening in the workpiece wherein said nose portion extends beyond the second surface of the workpiece;

expandable sleeve means carried on said core bolt shank portion between said nose portion of said expander means and the end of said core pin which passes through the opening in the workpiece, said expandable sleeve means having a reduced diameter intermediate portion such as to separate and detach said expandable means into a first and a second sleeve portion, said expandable sleeve means being operably engaged with said core pin such that said core pin causes said sleeve means to advance toward the second surface of the workpiece, said sleeve means being adapted to expand over said expander means tapered nose portion and thereafter to separate and detail at said reduced diameter intermediate portion such that said second sleeve portion expands over said first sleeve portion to bear against the second surface of the workpiece.

5. The blind fastener assembly of claim 4 further comprising resilient washer means carried on said core pin shank portion between said expander means and said expandable sleeve means, said sleeve means being adapted to force said washer means to expand over said expander means and over said tapered nose portion until said washer bears against the second surface of the workpiece.

6. The blind fasteners assembly of claim 5 wherein said resilient washer means is a coil spring which unwinds as it is expanded.

7. The blind fastener assembly of claim 4 wherein said core pin is threadably engaged with said sleeve means so that rotation of said core pin causes advancement of said sleeve means toward the workpiece second surface.

8. The blind fastener assembly of claim 4 wherein said head of said core pin is positioned on the side of the workpiece having the second surface, said core pin being adapted to be advanced through said expander means thereby causing said head of said core pin to force said sleeve means against said second surface of the workpiece.

9. The blind fastener assembly of claim 8 wherein said pin member is threadably engaged with said expander means so that rotation of said core pin will cause said advancement.

10. The blind fastener assembly of claim 5 wherein washer means rests on the surface of said core pin shank portion and is juxtaposed from said expander means nose portion and the end of said sleeve means facing the workpiece.

11. The blind fastener assembly of claim 4 wherein the end of said sleeve means facing the workpiece has a recessed region proximate said core pin shank portion to facilitate engagement and expansion thereof by said expander means tapered nose portion.

12. The blind fastener assembly of claim 5 wherein said washer means has a chamfered interior edge adjacent the surface of said core member shank portion to facilitate expansion of said washer means by said expander means nose portion.

13. The blind fastener assembly of claim 4 further comprising an internal annular recess formed in said second portion of said sleeve means adjacent said reduced diameter intermediate portion.

14. A joint assembly comprising:
a workpiece having a fist and a second surface with an opening therebetween;
a core pin including an shank portion formed to pass through the opening in said workpiece and an enlarged head at one end thereof;
expander means including an enlarged head at one end thereof formed to bear against the first surface of said workpiece, a tapered nose portion at the other end thereof, and a shank portion therebetween, said expander means having a bore there through adapted to receive said shank portion of said core pin and being adapted to fit into and extend through the opening in the workpiece wherein said nose portion extends beyond said second surface of said workpiece;
expandable sleeve means carried on said core bolt shank portion between said nose portion of said expander means and the end of said pin member which passes through the opening in said workpiece, said expandable sleeve means having a reduced diameter intermediate portion such as to separate and detach said expandable means into a first and a second sleeve portion, said expandable sleeve means being operably engaged with said core pin such that said core pin causes said sleeve means to advance toward said second surface of said workpiece, said sleeve means being adapted to expand over said expander means tapered nose portion and thereafter to separate and detach at said reduced diameter intermediate portion such that said second sleeve portion expands over said first sleeve portion to bear against said second surface of said workpiece.

15. The joint assembly of claim 14 further comprising resilient washer means carried on said core pin shank portion between said expander means and said expandable sleeve means.

16. The joint assembly of claim 15 wherein said resilient washer means is a coil spring which unwinds as it is expanded.

17. The joint assembly of claim 14 wherein said core pin is threadably engaged with said sleeve means so that rotation of said core pin causes advancement of said sleeve means toward the workpiece second surface.

18. The joint assembly of claim 14 wherein said head of said core pin is positioned on the side of the workpiece having the second surface, said core pin being adapted to be advanced through said expanded means thereby causing said head of said core pin to force said sleeve means against said second surface of the workpiece.

19. The joint assembly of claim 18 wherein said pin member is threadably engaged with said expander means so that rotation of said core pin will cause said advancement.

20. The joint assembly of claim 15 wherein said washer means rests on the surface of said core pin shank portion and is juxtaposed from said expander means nose portion and the end of said sleeve means facing the workpiece.

21. The joint assembly of claim 14 wherein the end of said sleeve means facing the workpiece has a recessed region proximate said core pin shank portion to facilitate engagement and expansion thereof by said expander means tapered nose portion.

22. The joint assembly of claim 15 wherein said washer means has a chamfered interior edge adjacent the surface of said core pin shank portion to facilitate expansion of said washer means by said expander means nose portion.

23. The joint assembly of claim 16 further comprising an internal annular recess formed in said second portion of said sleeve means adjacent said reduced diameter intermediate portion.

* * * * *

UNITED STATES PATENT AND TRADEMARK OFFICE
CERTIFICATE OF CORRECTION

PATENT NO.   :   4,832,548
DATED        :   May 23, 1989
INVENTOR(S)  :   Burton C. Strobel It is certified that error appears in the above-identified patent and that said Letters Patent is hereby corrected as shown below:

Column 9, line 13, "fist" should read -- first --.

Signed and Sealed this

Twelfth Day of June, 1990

Attest:

HARRY F. MANBECK, JR.

Attesting Officer

Commissioner of Patents and Trademarks